United States Patent [19]

Erdell

[11] 4,225,907
[45] Sep. 30, 1980

[54] FLASHLIGHT MAGNIFIER ATTACHMENT

[76] Inventor: John B. Erdell, 50 Morningside Dr., New York, N.Y. 10025

[21] Appl. No.: 972,989

[22] Filed: Dec. 26, 1978

[51] Int. Cl.³ .............................................. F21M 3/14
[52] U.S. Cl. ................................... 362/255; 362/118; 362/202; 362/398; 350/235
[58] Field of Search .................. 362/2, 118, 202, 255, 362/256, 398; 350/235, 243

[56] References Cited

U.S. PATENT DOCUMENTS

| 2,678,228 | 5/1954  | Gerhardt    | 362/398 |
| 2,725,788 | 12/1955 | Pflefer     | 350/235 |
| 2,336,440 | 3/1946  | Schmidt     | 350/235 |
| 3,628,871 | 12/1971 | Himmelstrup | 350/235 |

Primary Examiner—Donald P. Walsh
Attorney, Agent, or Firm—Leonard W. Suroff

[57] ABSTRACT

An assembly adapted for attachment to a penlight body, comprising housing means formed with a rear end and a front end in longitudinally spaced relationship to each other and an axially extending aperture extending inwardly from the rear end. The aperture is adapted to receive the bulbed end of the penlight body in seated telescopic relation thereto, and first magnetic means extending circumferentially on the housing means in spaced relationship to said front end and terminating in a free end thereof is used. Shoulder means is disposed intermediate the magnetic means and the front end with viewing means adapted to be mounted on the shoulder means. Coupling means having an inner end and a spaced apart outer end with an axially directed bore extending inwardly of the inner end is provided for securing the viewing means in removable fixed relationship to the first magnetic means by means of a magnetic force formed between the first magnetic means the coupling means. Second magnetic means extending within the viewing means in spaced relationship to the outer end is utilized. Filter means adapted to be positioned within the bore and magnetically attracted to the second magnetic means such that the filter means is readily replaced from time to time as desired is provided. The coupling means is at least partially fabricated from a metallic material having magnetic characteristics. The viewing means is sandwiched intermediate the free end of the first magnetic means and the inner end of the coupling means.

10 Claims, 6 Drawing Figures

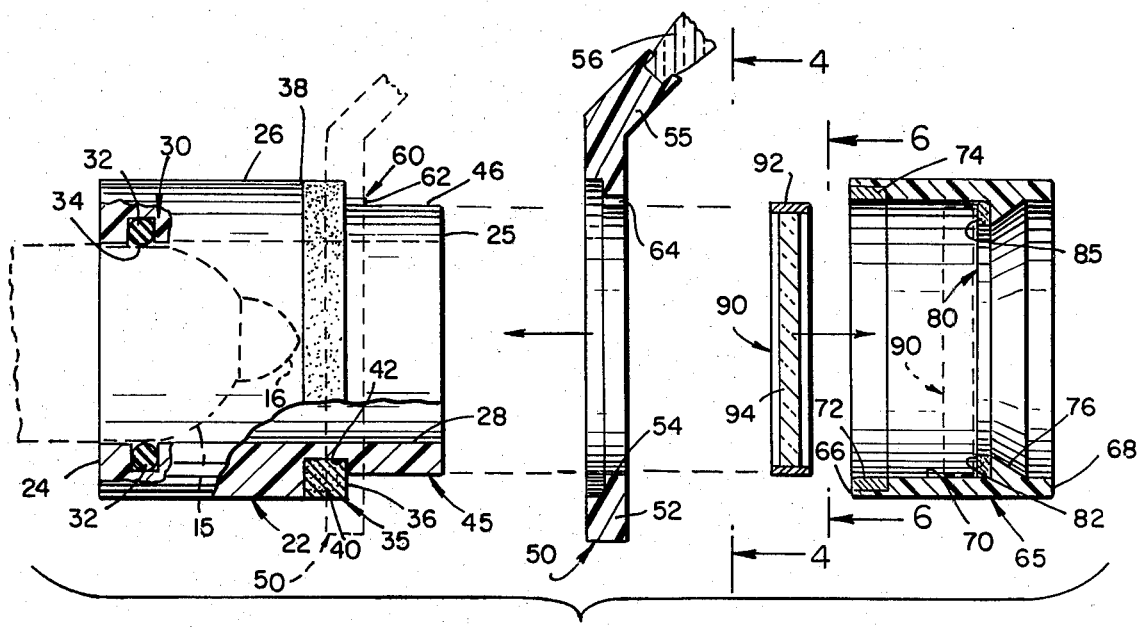
FIG. 3
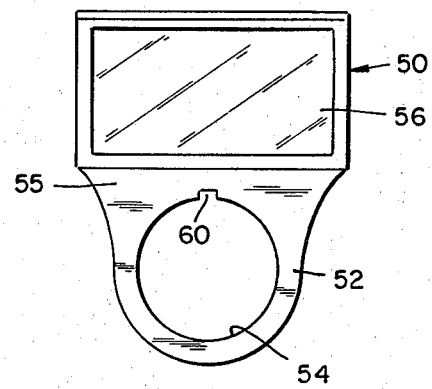
FIG. 4
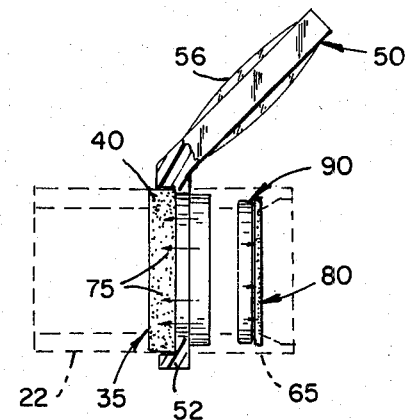
FIG. 5
FIG. 6
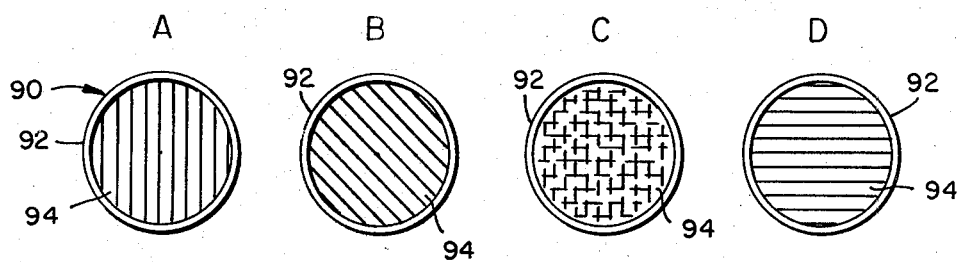

4,225,907

FLASHLIGHT MAGNIFIER ATTACHMENT

BACKGROUND OF THE INVENTION

The present invention relates to a penlight flashlight attachment assembly for photographic and other uses.

It has been found desirable to utilize a magnifying glass to view certain objects in photographic and other procedures, and concurrently it is necessary to use a filter in the assembly during use thereof. For example, there is illustrated in U.S. Pat. No. 2,178,371, issued Oct. 31, 1939, a combination flashlight and magnifying glass which does not lend itself to either the end purpose or the novelty of the present invention.

OBJECTS OF THE INVENTION

An object of the present invention is to provide a flashlight attachment assembly for photographic and other uses that may be readily assembled and disassembled and contains therein a lens or filter that is readily replaceable in order to have different colors.

Another object of the present invention is to provide a mechanism whereby a magnifying lens fixed relative to a flashlight body and the components of the assembly may be readily assembled and disassembled to interchange various filters to be used therewith.

Other objects and advantages of the present invention will become apparent as the disclosure proceeds.

SUMMARY OF THE INVENTION

An assembly adapted for attachment to a penlight body, comprising housing means formed with a rear end and a front end in longitudinally spaced relationship to each other and an axially extending aperture extending inwardly from the rear end. The aperture is adapted to receive the bulbed end of the penlight body in seated telescopic relation thereto, and first magnetic means extending circumferentially on the housing means in spaced relationship to said front end and terminating in a free end thereof is used.

Shoulder means is disposed intermediate the magnetic means and the front end with viewing means adapted to be mounted on the shoulder means. Coupling means having an inner end and a spaced apart outer end with an axially directed bore extending inwardly of the inner end is provided for securing the viewing means in removable fixed relationship to the first magnetic means by means of a magnetic force formed between the first magnetic means and the coupling means.

Second magnetic means extending within the viewing means in spaced relationship to the outer end is utilized. Filter means adapted to be positioned within the bore and magnetically attracted to the second magnetic means such that the filter means is readily replaced from time to time as desired is provided.

The coupling means is at least partially fabricated from a metallic material having magnetic characteristics. The viewing means is sandwiched intermediate the free end of the first magnetic means and the inner end of the coupling means. The filter means includes a portion thereof fabricated from a metallic material having magnetic characteristics. The magnetic material forms a ring extending circumferentially on the filter means.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part thereof, wherein like reference numerals refer to like parts throughout the several views and in which:

FIG. 3 is an enlarged exploded view in cross section of the assembly of the present invention;

FIG. 4 is a plan view taken along lines 4—4 of FIG. 3;

FIG. 5 is an assembled the magnetic fields of force utilized in the assembly of the present invention; and FIGS. 6A, B, C and D illustrate different color filter means that may be employed in accordance with the present invention.

DETAILED DESCRIPTION OF THE DRAWINGS

Figure 1:
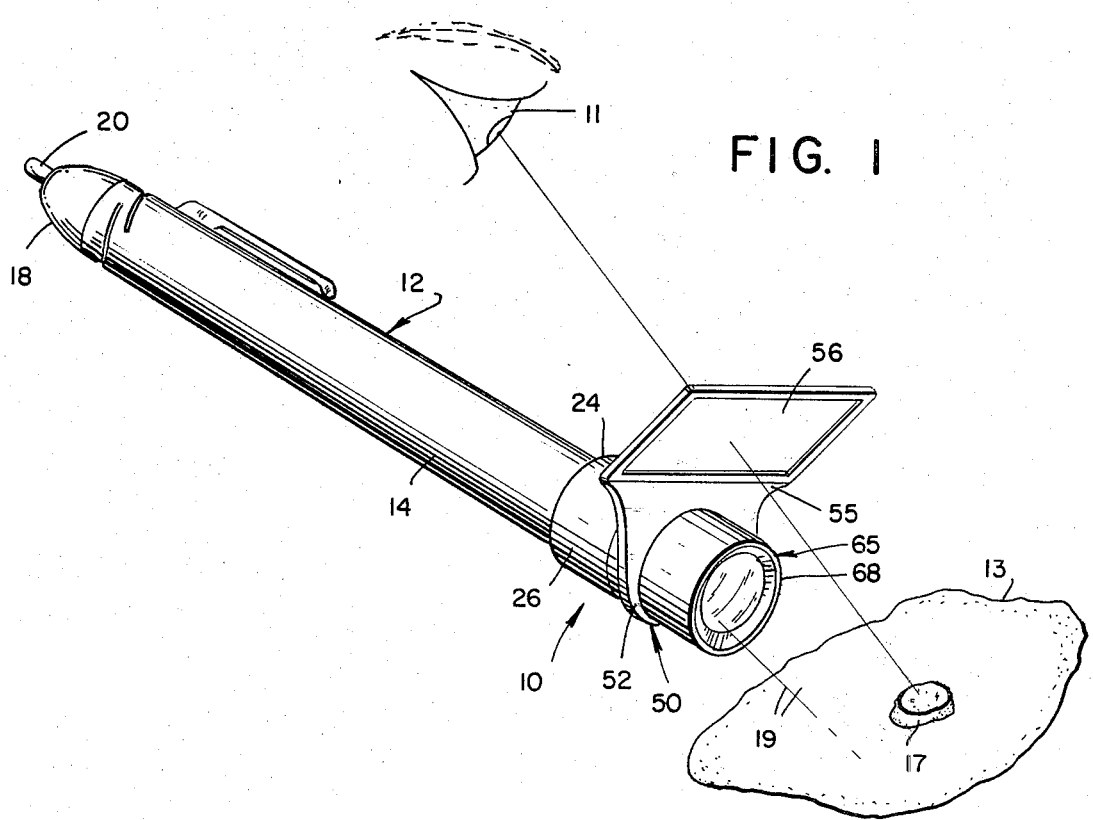
FIG. 1 is a perspective view of the flashlight magnifier attachment assembly in accordance with the present invention.

Referring to the drawings, there is illustrated in FIGS. 1 through 6 an assembly 10 adapted for attachment to a penlight or flashlight 12 having a body 14 terminating in a bulbous end 15 which has a bulb 16 associated therewith in a normal manner. The assembly 10 is so utilized that the eye 11 of the user may focus in upon an object 13 having specific indicia 17 thereon to be viewed. The indicia 17 is radiated by light 19 which is filtered through the assembly 10 in a manner hereinafter described in detail.

The penlight 12 may be of various diameters or lengths and may be of a conventional design or configuration well known in the art and readily positionable by the user of the assembly 10. The penlight body 14 may have a rear end 18 and the flashlight 12 may have a finger switch 20 associated therewith.

The assembly 10 includes housing means 22 formed from a metallic or plastic material and having a rear end 24 and a front end 25 in longitudinally spaced relationship to each other. The housing means 22 includes an outer wall surface 26 and may have a circular cross sectional configuration, as illustrated in FIG. 1. There is provided an axially extending aperture 28 extending inwardly from the rear end 24 for receiving the bulbous end 15 of the penlight body 14 in seated telescopic relation thereto.

Figure 2:
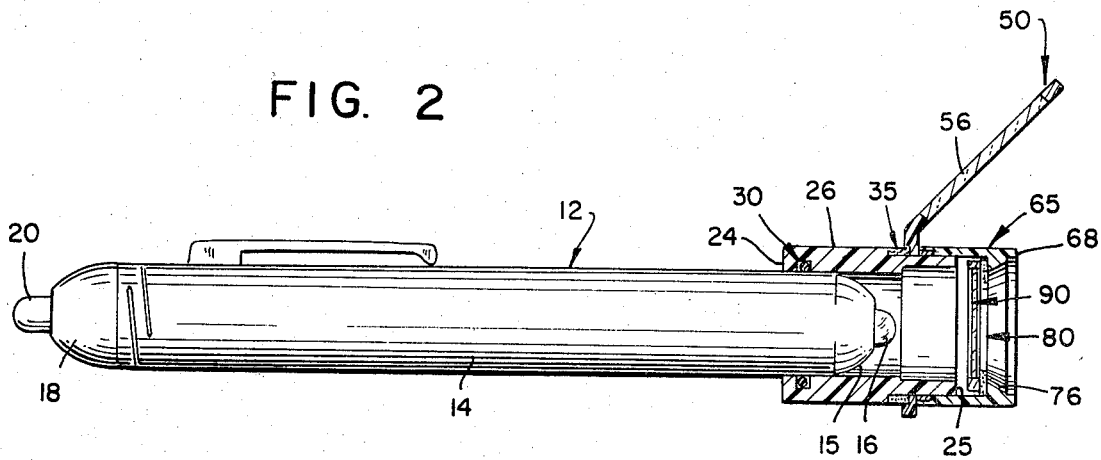
FIG. 2 is a side view, partially in section, of the assembly illustrated in FIG. 1.

The aperture 28 may extend axially through the housing means 22 from the rear end 24 to the front end 25. If desired, the housing means 22 may further include gripping means 30, as illustrated in FIGS. 2 and 3. The gripping means 30 may include an O-ring or other gasket material 32 mounted within a groove 34. The gripping means 30 provides for securement to the body 14, which diameter thereof may vary from manufacturer to manufacturer. In this manner the gripping means further assures a proper assembled relationship of the housing means 22 to the penlight body 14. The element 32 may be made from a soft rubber or other material.

There is also provided first magnetic means 35 extending circumferentially on the housing means 22 in spaced relationship to the front end 25 and terminating in a free end 36. The first magnetic means 35 may be in the form of a ring and is fabricated as a magnet and extends against the abutting wall 38 of the housing means 22, as illustrated in FIG. 3. The first magnetic means 35 includes a magnet 40 which may be contained in a groove or depression 42 provided therefor. Furthermore, the housing means 22 may be fabricated from more than one section and assembled into the position illustrated in FIG. 3.

The assembly 10 further includes shoulder means 45 disposed intermediate the first magnetic means 35 and the front end 25. The shoulder means 45 may include a shoulder surface 46 having a circular configuration and may be in coaxial alignment with the aperture 28. The distance between the free end 36 and the front end 25 is selected depending upon the physical dimensions of the additional components of the assembly 10 as hereinafter described. Accordingly, the first magnetic means 35 is fixedly secured to the housing means 22 by adhesive or other desired assembly mechanisms.

There is also provided viewing means 50 adapted to be mounted on the shoulder means 45, as illustrated in FIGS. 2 and 3. The viewing means 50 includes a base 52 having an opening 54 therethrough. The opening 54 is adapted to extend in telescopic relationship with the shoulder means 45 and the outer surface 46 thereof. The viewing means 50 further includes a flange 55 extending angularly relative to the base 52 with magnifying means 56 fixedly secured to the flange 55. The magnifying means 56 may be fabricated from plastic or glass and is disposed adjacent to the first magnetic means 35.

In order to provide proper mounting relationship and alignment between the viewing means 50 and housing means 22, there is further provided alignment means 60 which may take various shapes and configurations. One such configuration is providing a protrusion 62 on the shoulder means 45 and a slot or groove 64 within the viewing means 50 and as part of the opening 54 extending through the viewing means 50. In this manner proper alignment may be maintained so as to prevent angular rotation of the viewing means 50 relative to the assembly 10.

There is further provided coupling means 65 associated with the assembly 10. The coupling means 65 includes an inner end 66 and a spaced apart outer end 68 with an axially directed bore 70 extending inwardly of the inner end 66. The coupling means 65 acts in a manner for securing the viewing means 50 in removable fixed relationship to the first magnetic means 35 by means of a magnetic force formed between the first magnetic means 35 and the coupling means 65. The coupling means 65 may be fabricated from a plastic or a non-magnetic material.

In order to obtain the magnetic forces desired, the coupling means 65 includes a ring 72 which may be in the form of a rim fabricated from steel and adapted to be mounted within a cavity 74 extending inwardly from the inner end 66 of the coupling means 65. The ring 72 is such that it is magnetically attracted to the first magnetic means 35 in the assembled relationship of the assembly 10. Since the viewing means 50, and in particular the flange 55, is fabricated from a plastic material, the magnetic force is transmitted therethrough such that the viewing means 50 is sandwiched intermediate the free end 36 of the first magnetic means 35 and the inner end 66 of the coupling means 65.

In this manner the coupling means 65 is mounted utilizing the alignment means 60 so as to obtain the interrelationship with the aid of the magnetic forces illustrated by the arrows 75 in FIG. 5. The assembly is removably retained in operative position by utilization of the gripping means 30.

The coupling means 65 may further include an aperture 76 extending inwardly of the outer end 68 and connected to the axially directed bore 70 so as to permit the light from the bulb 16 of the penlight 12 to pass through.

There is also provided second magnetic means 80 extending within the viewing means 50 and in spaced relationship to the outer end 68 thereof. The second magnetic means 80 may be in the form of a ring 82 of magnetic material to form a magnet. The second magnetic means 80 is adapted to be positioned in abutting engagement with the seating means 85 which is contained at one end of the axially directed bore 70. The seating means 85 is adapted to receive the second magnetic means 80 thereagainst for positive positionment relative thereto.

The second magnetic means 80 may be fixedly secured within the coupling means 65 in a conventional manner and is adapted to function in conjunction with the filter means 90 which may be of a circular configuration. The filter means 90 as illustrated in FIGS. 6A, 6B, 6C, and 6D are respectively red, green, yellow, and blue per the appropriate shading in accordance with Patent Office guidelines. Obviously the particular selection of colors for the filter means 90 may vary. The filter means 90 is designed to be magnetically attracted to the second magnetic means 80 so that it may readily be replaced from time to time as desired. The filter means 90 includes a portion or element 92 that is fabricated from a metallic material having magnetic materials. The portion 92 may be in the form of a band extending circumferentially over the lens element 94 for each of the respective filter means 90 that are supplied with the assembly 10.

The cross sectional area of this filter means 90 with the band 92 thereon is dimensioned to be readily extended within the axially directed bore 70 such that it is magnetically attracted to the second magnetic means 80. In this manner the filter means 90 may be readily replaced upon removal of the coupling means 65 from its assembled relationship with the shoulder means 45 of the housing means 22.

Initially when the components of the assembly 10 are disassembled, the respective filter means 90 desired may be inserted into positionment within the coupling means 65, and due to the magnetic attraction between the band 92 and the second magnetic means 80, the filter means 90 remains in place for transmittal of light rays therethrough.

The viewing means 50 may then be positioned into the shoulder means 45 with proper utilization of the alignment means 60, as previously discussed. When this is accomplished, the coupling means 65 may be slid onto the shoulder means 45, and the magnetic attraction between the metallic steel ring 72 and the first magnetic means 35 is sufficient to effectuate the coupling relationship desired. The magnetic force may be readily overcome to disassemble the components of the assembly 10 as required when changing the filter means 90.

Although illustrative embodiments of the invention have been described in detail herein with reference to the accompanying drawings, it is to be understood that the invention is not limited to the precise embodiments, and that various changes and modifications may be effected therein without departing from the scope or spirit of the invention.

I claim:

1. An assembly adapted for attachment to a penlight body, comprising:
   A. housing means formed with a rear end and a front end in longitudinally spaced relationship to each other and an axially extending aperture extending inwardly from said rear end, said aperture adapted to receive the bulbed end of said penlight body in seated telescopic relation thereto,
   B. first magnetic means extending circumferentially on said housing means in spaced relationship to said front end and terminating in a free end thereof,
   C. shoulder means disposed intermediate said first magnetic means and said front end,
   D. viewing means adapted to be mounted on said shoulder means,
   E. coupling means having an inner end and a spaced apart outer end with an axially directed bore extending inwardly of said inner end for securing said viewing means in removable fixed relationship to said first magnetic means by means of a magnetic force formed between said first magnetic means and said coupling means,
   F. second magnetic means extending within said viewing means in spaced relationship to said outer end,
   G. filter means adapted to be positioned within said bore and magnetically attracted to said second magnetic means such that said filter means is readily replaced from time to time as desired,
   H. said coupling means being at least partially fabricated from a metallic material having magnetic characteristics, and including an aperture extending inwardly of said outer end and connected to said axially directed bore so as to permit the light from the bulbed end of said penlight to pass through said filter means such that said light may be directed at the object being viewed,
   I. said viewing means being sandwiched intermediate said free end of said first magnetic means and said inner end of said coupling means,
   J. said filter means includes a portion thereof fabricated from a metallic material having magnetic characteristics,
   K. said second magnetic means extending circumferentially to said filter means for removably retaining said filter means in position,
   L. alignment means to properly position said viewing means relative to said housing means, and
   M. said viewing means including:
      (1) a base having an opening therethrough, with said opening adapted to extend in telescopic relationship to said shoulder means,
      (2) a flange extending outwardly relative to said base, and
      (3) magnifying means fixedly secured to said flange.

2. An assembly as defined in claim 1, wherein said alignment means includes:
   a. a protrusion extending on said shoulder means, and
   b. a slot within said viewing means adapted to have said protrusion received therein so as to prevent angular rotation of said viewing means relative to said housing means.

3. An assembly as defined in claim 1, wherein said first magnetic means is fixedly secured to said housing means.

4. An assembly as defined in claim 1, wherein said magnifying means is rectangular in configuration and is disposed rearwardly of said inner end of said coupling means in the assembled relationship of said assembly.

5. An assembly as defined in claim 1, wherein said shoulder means is adapted to be received in telescopic relationship within said axially directed bore of said coupling means, and having said viewing means disposed between said housing means and said coupling means.

6. An assembly as defined in claim 1, and further including seating means at one end of said axially directed bore, so as to receive said second magnetic means thereagainst for positionment relative thereto.

7. An assembly as defined in claim 6, wherein said filter means extending within said axially directed bore is attracted to the magnetic field established by said second magnetic means and has an outer peripheral cross section facilitating easy insertion and removal within said axially directed bore.

8. An assembly as defined in claim 7, wherein said filter means is adapted to be inserted through said inner end of said coupling means for seated positionment within said axially directed bore.

9. An assembly as defined in claim 1, and further including gripping means associated with said housing means for frictionally engaging said housing means with the penlight body.

10. As assembly as defined in claim 9, wherein said gripping means includes an O-ring mounted within said housing means.

* * * * *